United States Patent Office 2,819,197
Patented Jan. 7, 1958

2,819,197

AROMATIC PROPIONITRILE NEMATOCIDAL COMPOSITIONS AND METHOD OF USING SAME

Philip H. Santmyer, Florissant, Mo., and Samuel Allen Heininger, Dayton, Ohio, assignors to Monsanto Chemical Company, St. Louis, Mo., a corporation of Delaware No Drawing. Application December 20, 1954
Serial No. 476,602

19 Claims. (Cl. 167—30)

This invention relates to methods of controlling parasitic worms and minimizing worm populations in agricultural soils. More specifically the invention relates to the destruction of nematodes, trematodes and cestodes in any of the egg, larvae, and adult stages of their life cycles, and particularly the parasitic worms which inhibit the normal development of crop plants.

The problem of controlling nematodes and other objectionable worm life is usually a complex problem, because to be an effective toxicant a compound must be able to penetrate the normally impervious cutex of the worm and enclosing membranes of the larvae and eggs and to interfere wtih a vital function of the organism. The mechanism of destroying the soil worm life is not fully understood, but it is believed that effective toxicants destroy or reduce the effectiveness of vital enzymes. However, a compound which is known to be capable of penetrating the membranes and capable of destroying critical enzymes of the organism may not be a suitable toxicant. The compound must be such that it will remain in the soil in contact with the undesirable worm life for a sufficient period of time to effect the penetration and destruction of the enzymes. To achieve this end it will be necessary for the toxicant to resist the destructive activity of soil bacteria, be capable of wetting the organism, to have a substantial water-solubility, to be capable of being readily mixed with the soil, and to have a sufficiently low vapor pressure so as to avoid evaporation before the destructive purpose is accomplished. Due to the exacting requirements of a practicable toxicant, it is impossible to predict the effectiveness of a particular chemical.

In accordance with this invention it has been found that compounds of the following structure are useful nematocides;

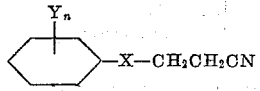

wherein X is a divalent radical of the group consisting of —O—, —NH—, —S—, and —NR—, in which R is an alkyl radical having up to four (4) carbon atoms; wherein Y is a radical of the group consisting of halogen and alkyl having up to four (4) carbon atoms and wherein $n$ is an integer from one (1) to five (5) inclusive.

Included within the scope of the claims are the following compounds:

β-(*Chlorophenoxy) propionitrile
β(2,4-dichlorophenoxy) propionitrile
β(*Cresoxy) propionitrile
β(*Chloroanilino) propionitrile
β(*Ethyl phenoxy) propionitrile
β(*Bromophenoxy) propionitrile
β(*Bromo-N-ethylanilino) propionitrile
β(*Methylanilino) propionitrile
β(*Chlorophenylmercapto) propionitrile
β(*Cressylmercapto) propionitrile
β(2,4-dichloroanilino) propionitrile
β(*N-dimethylanilino) propionitrile
β(*Iodophenoxy) propionitrile
β(*Iodophenylmercapto) propionitrile
β(*Fluorophenylmercapto) propionitrile \* Indicates that the useful compounds include the ortho, meta or para isomers.

Considerable variation in nematocidal activity is found in the above series of compounds, the phenoxy- and phenylmercapto-derivatives being more active than the anilino-derivatives, and the para-substituted compounds being more effective than the meta-substituted compounds, which are more useful than the ortho derivatives. Optimum activity is obtained by a para-substituted phenoxy propionitrile.

In the use of the toxicants in the destruction of nematodes and other objectionable worm life the compounds may be applied directly to the soil at rates of 25 to 600 lbs. per acre and may be added in pure state or mixed with suitable liquid or solid diluents. The preferred level of application useful in treating soils of average nematode infestation will be from 50 to 200 lbs. per acre. Obviously heavily infested areas may require the use of higher proportions and lightly infested areas may be treated effectively with smaller proportions.

The nematocidal compounds may be added to the soil in solid formulations, frequently referred to as dusts, which may contain in addition to the active ingredient, diluents or extenders to adsorb the readily volatile toxicant and thereby prevent the too rapid dissipation, and dispersing agents to prevent local high concentrations. In addition these components facilitate the distribution of the active ingredient in soil or soil waters.

Suitable solid diluents are those which render the compositions dry and permanently free-flowing. Thus hygroscopic materials should be avoided. Effective solid diluents are the finely divided carriers, including the clays such as the kaolinites, the bentonites and the attapulgites; other minerals in natural state, such as talc, pyrophyllite, quartz, diatomaceous earth, fuller's earth, chalk, rock phosphate and sulfur; and chemically modified minerals, such as acid washed bentonites, precipitated calcium phosphates, precipitated calcium carbonate and colloidal silica. These diluents may represent a substantial portion, for example 50 to 98 percent by weight of the entire formulations. Compositions of this type are useful where there is a tendency for the nematocide to be phytotoxic.

Liquid compositions for nematocidal uses may be solutions or liquid dispersions. The choice of the liquid medium will depend to a great extent upon the physical properties of the active ingredient. If the substituted nitriles are water-soluble, the liquid compositions may be merely an aqueous solution. Where the active component is insoluble in water or soluble only to a limited extent, it is frequently desirable to add a small amount of an organic solvent which can be readily dispersed in the aqueous medium to produce a heterogeneous dispersion of the active ingredient in water.

A valuable class of nematocidal formulations are those wherein there is present a surface active agent, which serves in providing formulations capable of being uniformly distributed in the soil. The surface active agents may be anionic, cationic, or non-ionic and include conventional soaps, such as the water-soluble salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil.

A useful formulation of the nematocidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil being treated. For this purpose readily flowable compositions are required, either liquid or solid in physical state. Thus a critical aspect of the invention is the fluent carrier by use of which optimum nematocidal effects can be obtained.

Although the β-(substituted phenoxy [or anilino]) propionitriles may be used in the pure state, it appears that more effective utilization of the active component is obtained when formulated with the conditioning agents as described.

Although the nematocidal compounds may be used in formulations as described above, it is often more convenient to use the toxicants in their free state. Since many of the compositions are relatively volatile liquids, they may be injected into the soil using regularly spaced injections of such size and distribution so that the entire volume of soil to be treated will contain an effective concentration of the toxicant.

Some of the compounds, the use of which is included within the scope of this invention, have other beneficial effects on the soil, for example insect eggs and larvae may be destroyed or their population reduced. Also many destructive types of functions will be destroyed and the vitality of objectionable weed seeds and fungi may be affected by treating the soil with these substituted nitriles.

Further details of the practice of this invention are set forth with respect to the following examples.

Example 1

Preliminary screening experiments were conducted by preparing a suspension of the nematode *Panagrellus redivivus* in water and observing through a microscope the motility of the organism in the presence of varying concentrations of reagent. The nematode in aqueous suspension will normally flex its body at a regular rate and as the nematocide takes effect the rate of flexation will decrease until death occurs. The following table identifies several compositions and sets forth the time required to effect 100 percent kill.

| | Concentration | |
|---|---|---|
| | 0.1% | 0.01% |
| β(p-chloroanilino) propionitrile | 20 min | 24 hrs. |
| β(o-chlorophenoxy) propionitrile | 2 hrs | 24 hrs. |
| β(p-cresoxy) propionitrile | 20 min | 24 hrs. |
| β(m-chloroanilino) propionitrile | 24 hrs | 24 hrs. |
| β-phenoxypropionitrile | (Negligible kill in 24 hrs.) | |
| 3-butoxypropionitrile | (Negligible kill in 24 hrs.) | |
| 3(octylphenoxy) propionitrile | (Negligible kill in 24 hrs.) | |

Example 2

Secondary screening experiments took place in a greenhouse using soil infested with the nematode *Meloidogyne incognita* var. *acreta*. The soil was placed in flower pots and treated with the nematocides indicated in the following table at both rates of 200 lbs. per acre and 2000 lbs. per acre. The table also sets forth the degree of kill after a 24 hour period. Subsequently tomato plants were grown in the soil to determine the practical effectiveness of the nematocide and to study phytotoxicity, no evidence of nematode attack being observed and no phytotoxicity at the 200 lbs. per acre application level.

| | 200 lbs./A | 2,000 lbs./A |
|---|---|---|
| | Percent | Percent |
| β(p-chloroanilino) propionitrile | 95 | 100 |
| β(o-chlorophenoxy) propionitrile | 95 | 100 |
| β(p-cresoxy) propionitrile | 100 | 100 |
| β(m-chloroanilino) propionitrile | 100 | 100 |

Example 3

Large scale field trials were conducted using β(p-chloroanilino) propionitrile. Application was made to the soil by injection at 1 ft. intervals such that total application of 200 lbs. per acre was obtained. The effectiveness of the nematocide was measured by counting the nematodes in the treated and untreated soils, the count being made by microscopic examination of a water suspension of nematodes separated by screening the soil samples. It was found that the nematode population in the soil was reduced 94 percent.

What is claimed is:

1. The method of killing parasitic worm life in agricultural soils which comprises contacting the organism with a compound of the structural formula

wherein X is a divalent radical of the group consisting of —O—, —NH—, —S—, and —NR—, in which R is an alkyl radical having up to four (4) carbon atoms; wherein Y is a radical of the group consisting of halogen and alkyl having up to four (4) carbon atoms and wherein $n$ is an integer from one (1) to five (5) inclusive.

2. The method of claim 1 wherein the organism is contacted with β(p-cresoxy) propionitrile.

3. The method of claim 1 wherein the organism is contacted with β(p-chloroanilino) propionitrile.

4. The method of claim 1 wherein the organism is contacted with β(p-chlorophenoxy) propionitrile.

5. The method of claim 1 wherein the organism is contacted with β(m-chloroanilino) propionitrile.

6. The method of claim 1 wherein the organism is contacted with β(o-chlorophenoxy) propionitrile.

7. The method of controlling parasitic worm life in agricultural soils which comprises introducing into the soil a compound of the structure

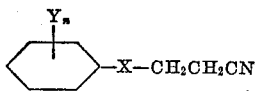

wherein X is a divalent radical of the group consisting of —O—, —NH—, —S—, and —NR—, in which R is an alkyl radical having up to four (4) carbon atoms; wherein Y is a radical of the group consisting of halogen and alkyl having up to four (4) carbon atoms and wherein n is an integer from one (1) to five (5) inclusive.

8. The method of claim 7 wherein the introduced compound is β(p-cresoxy) propionitrile.

9. The method of claim 7 wherein the introduced compound is β(p-chloroanilino) propionitrile.

10. The method of claim 7 wherein the introduced compound is β(p-chlorophenoxy) propionitrile.

11. The method of claim 7 wherein the introduced compound is β(m-chloroanilino) propionitrile.

12. The method of claim 7 wherein the introduced compound is β(o-chlorophenoxy) propionitrile.

13. The method of controlling parasitic worm life in soil which comprises dispersing in the soil 50 to 600 lbs. per acre of a compound of the structure

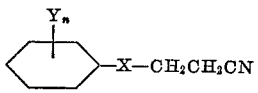

wherein X is a divalent radical of the group consisting of —O—, —NH—, —S—, and —NR—, in which R is an alkyl radical having up to four (4) carbon atoms; wherein Y is a radical of the group consisting of halogen and alkyl having up to four (4) carbon atoms and wherein n is an integer from one (1) to five (5) inclusive.

14. A nematocidal composition comprising a conditioning agent and a compound of the structure

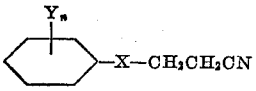

wherein X is a divalent radical of the group consisting of —O—, —NH—, —S—, and —NR—, in which R is an alkyl radical having up to four (4) carbon atoms; wherein Y is a radical of the group consisting of halogen and alkyl having up to four (4) carbon atoms and wherein n is an integer from one (1) to five (5) inclusive.

15. The composition defined by claim 14 wherein the compound is β(p-cresoxy) propionitrile.

16. The composition defined by claim 14 wherein the compound is β(p-chloroanilino) propionitrile.

17. The composition defined by claim 14 wherein the compound is β(p-chlorophenoxy) propionitrile.

18. The composition defined by claim 14 wherein the compound is β(m-chloroanilino) propionitrile.

19. The composition defined by claim 14 wherein the compound is β(o-chlorophenoxy) propionitrile.

References Cited in the file of this patent

UNITED STATES PATENTS

| 2,618,582 | Bruckmann | Nov. 18, 1952 |
| 2,651,579 | Plump | Sept. 8, 1953 |
| 2,666,079 | Harman | Jan. 12, 1954 |

FOREIGN PATENTS

| 670,357 | Germany | Jan. 17, 1939 |

OTHER REFERENCES

King: Chemicals Evaluated as Insecticides and Repellants at Orlando, Fla., U. S. D. A., Agr. Res. Serv., Agr. Handbook No. 69, May 1954, pp. 4–7, 15 and 295 pert.